United States Patent [19]

Vilk et al.

[11] Patent Number: 4,728,354
[45] Date of Patent: Mar. 1, 1988

[54] APPARATUS FOR STRAIGHT-LINE SHEARING OF MOLTEN GLASS GOBS

[75] Inventors: Peter Vilk, London; Alan Stephens, Greenford, both of England

[73] Assignee: BH-F (Engineering) Limited, England

[21] Appl. No.: 17,008

[22] Filed: Feb. 18, 1987

Related U.S. Application Data

[63] Continuation of Ser. No. 729,148, Apr. 30, 1985, abandoned.

[30] Foreign Application Priority Data

May 14, 1984 [GB] United Kingdom ............... 8412249

[51] Int. Cl.$^4$ ........................... C03B 7/10; B26D 5/08
[52] U.S. Cl. ..................................... 65/334; 83/623; 83/694
[58] Field of Search ............... 65/122, 127, 133, 158, 65/163, 174, 334; 83/623, 694

[56] References Cited

U.S. PATENT DOCUMENTS

| 3,592,938 | 7/1971 | Bracken et al. | 65/334 |
| 3,996,037 | 12/1976 | Wythe | 65/334 |
| 4,214,497 | 7/1980 | Dahms | 83/623 |
| 4,388,100 | 6/1983 | Marroquin | 65/334 |
| 4,500,334 | 2/1985 | Parkell et al. | 65/334 |

FOREIGN PATENT DOCUMENTS

| 0087966 | 9/1983 | European Pat. Off. |
| 1216213 | 12/1970 | United Kingdom . |
| 2014128 | 8/1979 | United Kingdom . |
| 2112328 | 7/1983 | United Kingdom . |
| 2123809 | 2/1984 | United Kingdom . |

Primary Examiner—Kenneth M. Schor
Assistant Examiner—Michael K. Boyer
Attorney, Agent, or Firm—Cushman, Darby & Cushman

[57] ABSTRACT

In apparatus for the straight-line shearing of molten glass gobs, first and second carriage members have mounted thereon one or more opposing pairs of shear blades which are caused reciprocally to move towards each other and then away from each other along a substantially straight line between an open position and a closed cutting position. The carriage members are slidably mounted on wayrods and are connected to diametrically opposed crank arms extending from a rotatably driven shaft. As the shaft is caused to rotate, the carriage members reciprocally slide on the wayrods between the open and closed positions.

9 Claims, 4 Drawing Figures

APPARATUS FOR STRAIGHT-LINE SHEARING OF MOLTEN GLASS GOBS

This is a continuation of application Ser. No. 729,148, filed Apr. 30, 1985, which was abandoned upon the filing hereof.

FIELD OF THE INVENTION

This invention relates to straight-line shearing in glassware manufacture.

BACKGROUND TO THE INVENTION

In the manufacture of glassware, particularly of glass bottles, the glassware are formed from gobs of glass. These glass gobs are obtained by forcing molten glass through an orifice in the floor of a refractory trough containing the molten glass from the glass furnace. The glass is forced through the orifice by means of an axially reciprocating plunger above the orifice. Below the orifice the gob is cut off and drops away. The glass gob, while still hot, then undergoes further treatment e.g. the moulding into the desired glassware.

The gobs are cut off by means of shears mounted below the orifice in the refractory trough floor. Two forms of shear construction are used. In most commercial glassware manufacturing plants, the shears comprise opposing shear blades mounted on pivotally connected arms. In use these shear blades move between their open and their closed, cutting positions along arcuate paths in a scissor-type action.

The increased production rates required these days have brought with them high speeds of operation for the apparatus. Moreover gob production is further increased by using multi-gob installations. At high speed applications the scissor-type shears have a tendency to excessive wear in the mechanism. Moreover, with multi-gob installations, more than one pair of opposing shear blades may be mounted on the pivotally connected arms of the shears. With this construction the gobs will not all be cut simultaneously. Thus the gobs will not be delivered to for example the moulds at the same time leading to variations in moulding times.

To overcome these problems there has been proposed the use of straight-line shearing. In straight-line shearing the shear blades reciprocally move along a straight line towards and away from each other between the closed, cutting position and the open position in contrast to the arcuate swinging motion of the previously used shears. With straight-line shearing therefore, by having a plurality of opposing shear blade pairs mounted in parallel, a plurality of gobs may be sheared simultaneously and accordingly delivered to the forming moulds simultaneously.

Straight-line shearing apparatus has for example been proposed in U.S. Pat. Nos. 1,642,966 and 3,996,037 and British Patent Specification No. 1216213. However the reliability of the complex mechanisms disclosed tends to be somewhat low leading to the shearing apparatus being out of operation for unacceptably long periods of time and therefore resulting in unacceptably long periods lost to production. More recently straight-line shearing apparatus has been disclosed in British Patent Specification No: 2014128A. In this apparatus the reciprocatable movement of the shear blades is effected by means of a pneumatic mechanism. Again the mechanism tends to be complex and this of course brings with it unreliability.

British Patent Specification No: 2112378A describes apparatus having a plurality of opposing shear blade pairs mounted on pivotal arms. Thus again this is an example of shears wherein the blades are swung along an arcuate path. According to British Patent Specification No: 2112378A however there is used a somewhat complicated bellcranks mechanism which is said to synchronise the shearing operation so that all gobs are sheared at the same time.

British Patent Specification No: 2123809A describes a shearing mechanism operating in a straight line wherein opposing pairs of shear blades are mounted on reciprocal slides which move towards and away from each other along a linear path. The movement of the slides towards and away from each other is effected by the oscillation of a crank sleeve mounted for oscillation about a vertical axis and having diametrically opposing radially extended arms, each of which is connected to one of the blade bearing slides. When the crank sleeve is oscillated in one direction the blade bearing slides are caused to move towards each other to the closed, cutting position and when the crank sleeve is moved in the reverse direction the blade bearing slides are caused to move away from each other to the open position. The crank sleeve is operated from a shear cam in a manner well known in the art to cause the shear blades to move away from each other to the open position and, upon release of the opening force, a spring moves the crank sleeve and accordingly also the shear blades to the closed, cutting position.

In all these glassware manufacturing operations, the gob shears must of course be synchronised with the gob production, that is with the rate of reciprocation of the plungers. Much attention has been given to achieving this synchronisation. One such control mechanism is described in European Patent Specification No: 0087966.

Generally, whether scissor-type shears or straight-line shearing is used, the higher the rate of gob production the higher the speed of operation of the shears. Thus the shearing forces will be varied with the rate of gob production. Moreover maximum cutting rates are usually of the order of 150 per minute.

SUMMARY OF THE INVENTION

According to the present invention there is provided apparatus for straight-line shearing of molten glass gobs which apparatus comprises first and second carriage members having mounted thereon one or more opposing pairs of shear blades, each carriage member being connected via a crank to a rotatably driven shaft such that during one revolution of the shaft the cranks cause the carriage members reciprocally to move towards each other and then away from each other along a substantially straight line such that the shear blades mounted thereon reciprocate along a substantially straight line between an open position and a closed, cutting position and back to the open position.

The present invention thus offers apparatus which is of comparatively very simple construction and accordingly more reliable in actual use even at high speeds.

Furthermore in use of the construction according to the present invention, the rotatable shaft is driven in the same direction during both the closing and opening movements of the shear blades. This is in contrast to the oscillation of British Patent Specification No: 2123809A where the vertically mounted crank drive sleeve first is moved in one direction to open the blades and then returned, under spring force, to close the blades.

The present invention also provides a method for the shearing of glass gobs in glassware manufacture using an apparatus according to the present invention.

The apparatus according to the present invention may comprise only one pair of shear blades. Preferably though more than one pair of shear blades are mounted parallel to each other on the carriage members making the apparatus suitable for use with a multi-gob installation.

The apparatus according to the present invention suitably comprises a frame member for mounting below the orifices in the floor of a refractory trough when the apparatus is in use and which frame member can for example be swung out from below the trough for e.g. maintenance of the apparatus. The frame member suitably comprises wayrods which extend substantially parallel to the line of movement of the shear blades, the blade carriage members then being suitably slidably mounted on the wayrods. The apparatus according to the present invention most preferably comprises at least one such wayrod disposed on each side of the cutting area of the apparatus. Each blade carriage member may then extend between the wayrods and be mounted on wayrods on both sides of the cutting area. Alternatively the blade carriage members may each be mounted only on one side of the cutting area.

With the apparatus according to the present invention, the carriage members (and accordingly also the shear blades mounted thereon) are caused to move from open to closed position and back to the open position during one revolution of the rotatably driven shaft. The rotatably driven shaft is thus suitably mounted for rotation about a horizontal axis in the plane of movement of the blades and has crank arms extending from the shaft in diametrically opposite directions, i.e. they are at 180° to each other. Pivotally mounted connecting rods then join each of the crank arms to one of the blade carriage members such that on one revolution of the shaft, the carriage members are brought together to bring the shear blades to their closed, cutting position and then moved apart to return to the open position.

The opening and closing of the shear blades must of course be synchronised with the formation of the gobs to be cut i.e. with the movement of the plungers of the refractory trough. Thus the number of cuts by the shear blades required in a given time period will depend upon the rate of gob formation. This could be achieved according to the present invention by having the driven shaft, to which the carriage members of the apparatus according to the present invention are connected via the cranks, in constant but variable rotation. However with such a construction the cutting velocity of the shear blades and accordingly the shearing forces will vary with the number of cuts in a given time period required.

It is preferred according to the present invention to drive the rotatable shaft, which in turn causes the carriage members to move, with a motor which goes from rest to speed and rest again in one revolution. Thus, every time a gob has to be sheared, the motor is turned through one revolution and the carriage members and shear blade mounted thereon are brought to the closed, cutting position and then returned to the open, non-cutting position. The carriage members and blades then dwell in the open position until the next gob has to be cut when the motor is then put through another revolution and the shear blades brought to the closed cutting position and then back to the open position again. With this construction therefore the shearing forces on each cut are the same whatever the number of cuts for example per minute may be. The slower the cutting rate with such a construction the longer will be the dwell time of the carriage members and shear blades in the open position. At maximum cutting rate the motor will be running substantially constantly. In this way cutting rates of 180 to 200 per minute may be achieved.

Motors suitable for use according to this preferred embodiment of the present invention are ceramic and rare earth magnet servo motors.

The running of the motor of the apparatus according to the present invention must of course be synchronised with the gob formation to ensure that the shear blades move to the cutting position when the gob formed therebetween is ready for cutting. This control may most conveniently be provided by electronic means. For example suitably the signal to start the motor can be provided from a proximity switch on the main plunger mechanism of the glass forming apparatus.

It is important that the shear blades of the apparatus according to the present invention should always be in the open position when the motor is at rest. In order to ensure that this is the case, there is suitably provided a positional sensor, e.g. for the rotatable shaft, to ensure that this is in the position to ensure that the blades are open when the motor is at rest and, in the event that they are not, to provide the necessary signal to the control apparatus to ensure that the blades are moved to their open position.

BRIEF DESCRIPTION OF THE DRAWINGS

This invention is further illustrated by way of example with reference to the accompanying drawings in which.

Figure 1:
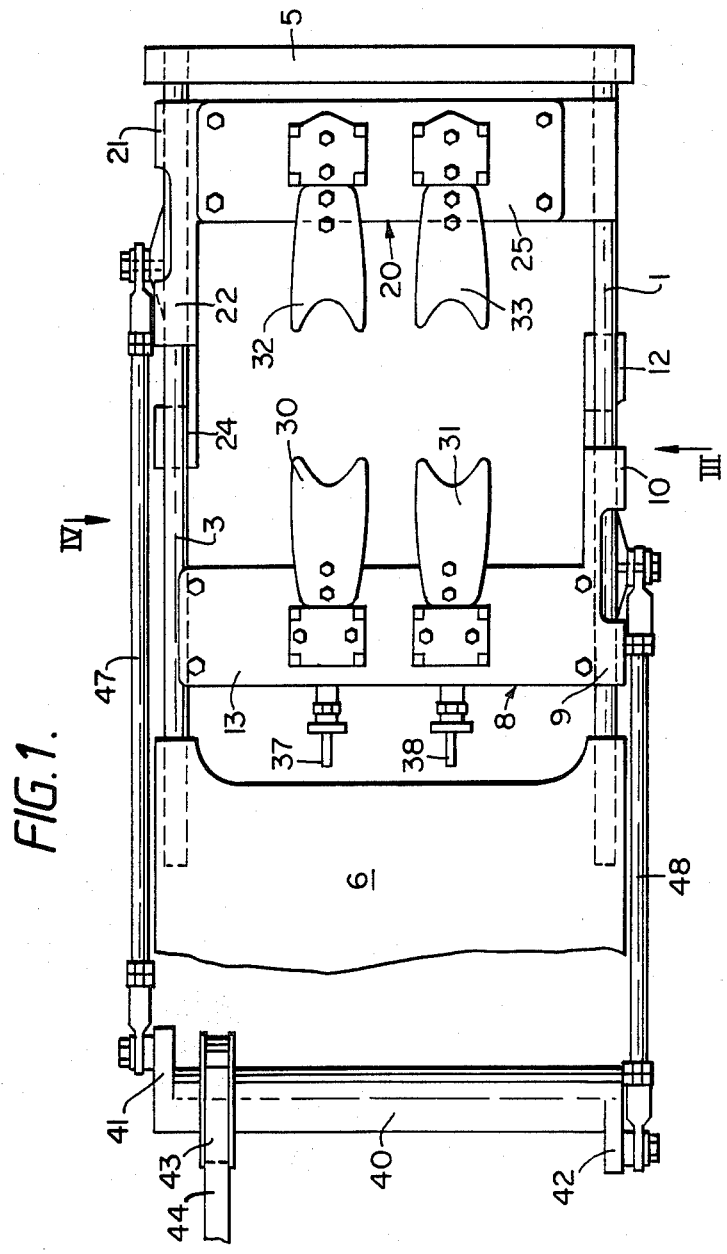
FIG. 1 is a diagrammatic plan view of apparatus according to the invention in the open position, with part cut-away to show the crank mechanism.

There is shown in the drawings apparatus according to the present invention having two pairs of shear blades for use in a double gob installation. However it is to be understood that the apparatus may also be used in single gob installations requiring only one pair of shear blades and, using more pairs of shear blades, in triple etc. gob installations.

DESCRIPTION OF SPECIFIC EMBODIMENT

Referring to the drawings, the apparatus according to the present invention comprises two opposing pairs of parallel wayrods 1, 2 and 3, 4 held between an end-plate 5 and a wayrod frame support 6.

A carriage member 8 has four sleeves 9, 10 and 11, 12 slidable on wayrods 1 and 2 respectively. Accordingly the whole of carriage member 8 is axially slidable along wayrods 1 and 2. The carriage member 8 also comprises a cantilever member 13 which extends between and perpendicular to the two opposing pairs of wayrods 1, 2 and 3, 4. The free end of cantilever member 13 is provided with a wear pad 14 against the underside of wayrod 3.

In a similar way a second carriage member 20 has sleeves 21 and 22 slidable on wayrod 3 and 23 and 24 slidable on wayrod 4 so that the carriage member 20 is slidable axially along wayrods 3 and 4. Also similarly a cantilever member 25 extends between and perpendicular to the two opposing pairs of wayrods and has at its free end a wear pad 26 which bears on the upper part of wayrod 1.

Mounted on the cantilever member 13 of carriage member 8 are two parallel upper shear blades 30, 31. On the cantilever member 25 of the second carriage member 20 there are mounted opposing lower shear blades 32, 33. The mounting of the lower shear blades 30, 31 is adjustable in height so that the tension of the lower blades 32, 33 to the upper shear blades 30, 31 can be adjusted.

Also mounted on the cantilever member 13, below each of the upper shear blades 30, 31 are a pair of drop guides 35, 36 respectively. Each drop guide is provided with a screw adjustment 37, 38 respectively whereby the horizontal position of the drop guide can be adjusted.

A horizontally disposed rotatable shaft 40 has extending from opposite ends thereof crank arms 41, 42, which crank arms extend from the shaft 40 in diametrically opposite directions. Secured to the rotatable shaft 40 is a drive 43 driven by means of a belt 44 from a motor 45 whereby the rotatable shaft is rotated about the horizontal axis. The motor 45 is a motor capable of going from rest to full speed and returning to rest during one revolution. The running of motor 45 is controlled electronically.

Crank arm 41 of rotatable shaft 40 is connected to carriage member 20 by means of a connecting rod 47 which is pivotally mounted on crank arm 41 and on carriage member 20 and extends substantially parallel to the wayrods 1, 2, 3, 4. Similarly the other crank arm 42 is connected by a connecting rod 48 to the first carriage member 8; the connecting rod 48 being pivotally mounted at one end on crank arm 42 and at the other end on carriage member 8 and extending substantially parallel to the wayrods 1, 2, 3, 4.

In use the apparatus according to the present invention is positioned under the orifices of a refractory trough through which glass if forced by means of plungers reciprocating thereabove. Suitably the wayrod support frame 6 is supported such that it is rotatable about a vertical axis so that the apparatus according to the present invention can be swung out horizontally from beneath the refractory trough for access not only to the apparatus according to the present invention but also to the orifice rings in the trough spout. Then the apparatus according to the present invention simply has to be swung back into position under the orifices, when for example any necessary maintenance or adjustment has been done, ready for use. Also preferably the wayrod support frame 6 is supported such that its height, and therefore also that of the shear blades under the orifices is adjustable.

Figure 4:
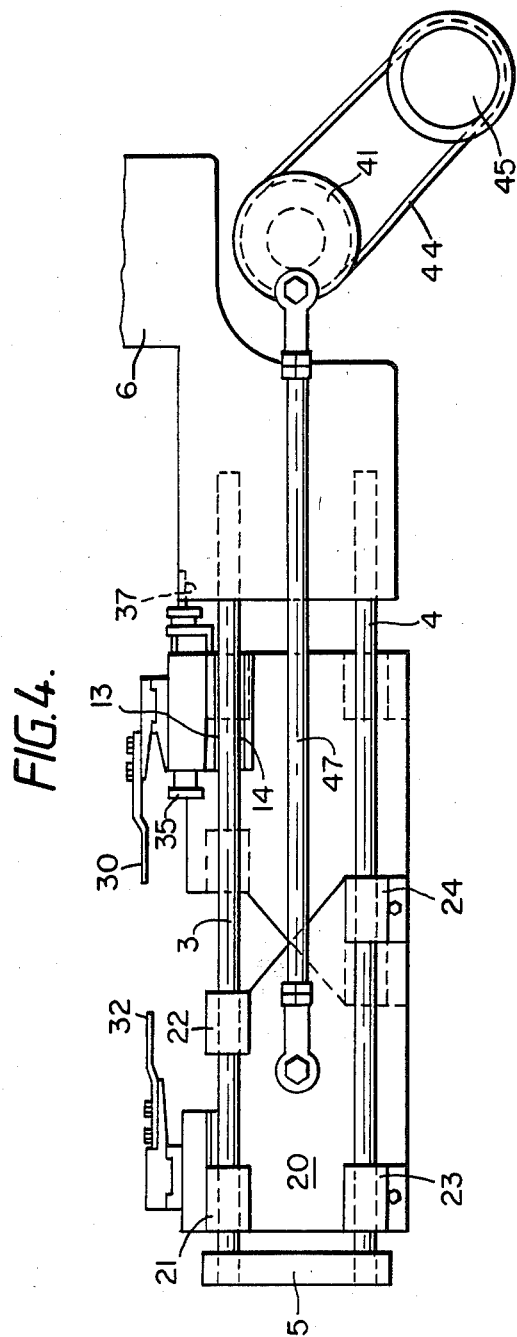
FIG. 4 is a side view on the arrow IV of the apparatus of FIGS. 1 and 2 in the open position.

When the apparatus according to the present invention is at rest, e.g. during dwell time between cuts, the carriage members 8 and 20 and the shear blades 30, 31, 32, 33 are in the open position shown in FIGS. 1 and 4 to allow the formation of a gob of glass between each pair of the opposing shear blades. When it receives a signal to do so, the motor 45 is started up and goes through one revolution and returns to rest. It is of course important that the movement of the shear blades is synchronised with the formation of the glass gobs. This is suitably achieved by synchronising the drive of the motor 45 with the movement of the main plunger mechanism. Thus suitably the signal for the motor 45 is taken from a proximity switch on the main plunger mechanism.

When the signal is received, the motor 45 is started up, the rotatable shaft 40 is driven through one revolution via drive belt 44 and drive wheel 43 secured to the rotatable shaft 40. The rotational movement of shaft 40 is transformed, via crank arms 41, 42 and connecting rods 47, 48 into longitudinal reciprocal movement of carriage 8 on wayrods 1 and 2 and of carriage 20 on wayrods 3 and 4. Because the connecting rods 47 and 48 are connected to diametrically opposite crank arms 41 and 42, the carriage members 20 and 8 are slid along their respective wayrods 3, 4 and 1, 2 in opposite directions as the shaft 40 is rotated.

When the motor 45 is started up and therefore the shaft 40 is rotated, this motion is first transformed via the connecting rods 47, 48 to slide the carriage members 20, 8 from their open position shown in FIGS. 1 and 4 towards one another until half a revolution has been completed. At this point the carriage members 8 and 20 have reached the closed position shown in FIGS. 2 and 3 with the shear blades 30, 31 and 32, 33 in the cutting position where they cut off the gobs formed on the corresponding undersides of the orifice of the refractory trough.

During cutting there is a tendency for the upper shear blades 30, 31 to be pushed upwards and accordingly the wear pad 14 on their carriage member 13 bears against the underside of wayrod 3. Similarly there is a downward force on the lower shear blades 32, 33 and wear pad 26 accordingly bears against the upper side of wayrod 1.

Drop guides 35, 36 below the upper shear blades 30, 31 ensure that the gobs drop vertically. The positioning of the drop guides can be effected while the mechanism is running by adjustment of screw adjustments 37, 38 and there is no need to stop operation for this adjustment.

During the second half of the revolution of rotatable shaft 40 the carriage members 8, 20 and the shear blades mounted thereon 30, 31 and 32, 33 are moved away from one another to return to the open position shown in FIGS. 1 and 4 to allow further gobs of glass to form between the opposing shear blade pairs.

The open position is then retained until the motor 45 receives another signal from the proximity switch on the main plunger mechanism to start up. Then the shaft 40 is driven through another revolution so again the carriage members 8 and 20 are moved towards each other to bring the shear blades to the closed, cutting position to cut the next gobs and then they are returned to the open position again to rest until the motor 45 receives a signal to start again. Thus with the apparatus according to the present invention the shearing forces, whatever the cutting rate, are constant since the acceleration and deceleration of the motor 45 during one revolution are the same. What varies with different cutting rates is the amount of dwell time of the apparatus according to the present invention in the open position between each cut i.e. before the next signal is received by the motor 45 and it starts up.

Figure 2:
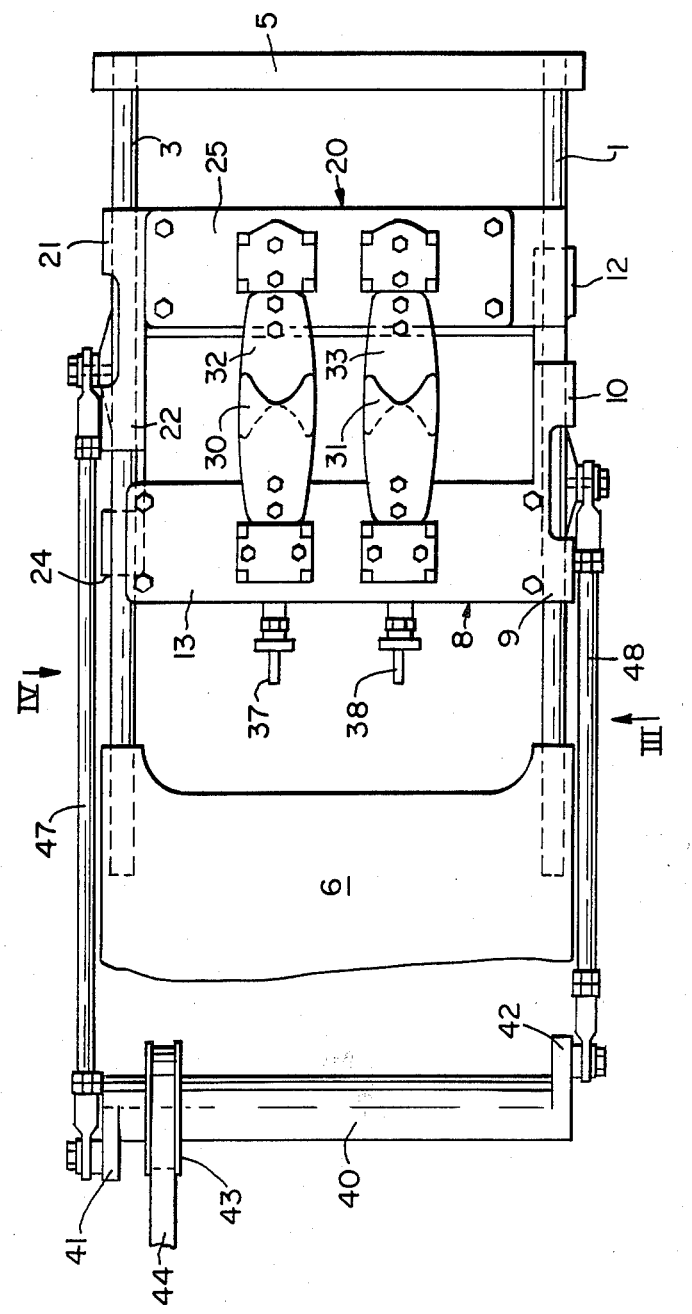
FIG. 2 is a diagrammatic plan view of the apparatus according to FIG. 1 in the closed, cutting position.
Figure 3:
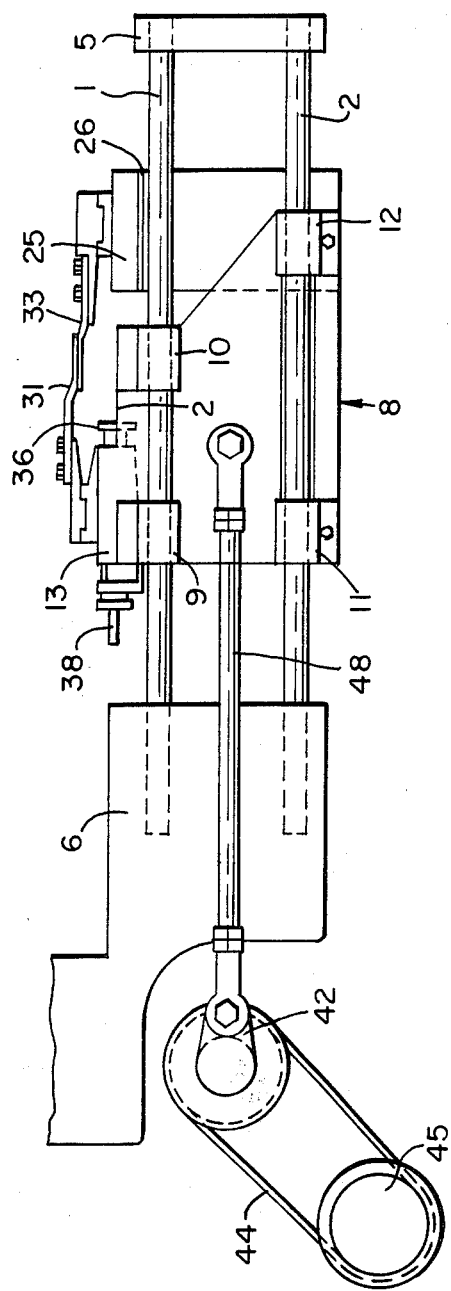
FIG. 3 is a side view on the arrow III of the apparatus of FIGS. 1 and 2 in the closed, cutting position.

The apparatus according to the present invention is simple in construction and accordingly more reliable in use, even at high operating speeds. It permits shearing forces to be maintained whatever the cutting rate and the cutting rate itself can be very simply synchronised with the plunger stroke rate. Moreover because of the simplicity of the apparatus according to the present invention it is readily adjustable. Thus shear blade tension can be adjusted by simply altering the height of the lower shear blade, and the position of the drop guides 35, 36 by adjusting screw adjustments 37, 38. In addition the shear blade overlap may be adjusted by adjusting the alignment of rotatable shaft 40. If the shaft is rotated clockwise as seen in FIGS. 1 and 2 the carriage member 20 is moved slightly to the right and the carriage member 8 slightly to the left as seen in FIGS. 1 and 2 and accordingly the shear blade overlap is increased. Rotation slightly anti-clockwise on the other hand bring the two carriage members 8 and 20 towards each other and thus shear blade overlap is increased.

In order to ensure that, when the motor 45 is at rest, the apparatus according to the invention is always in the open position, there is suitably provided a positional sensor e.g. on rotatable shaft 40 or one of crank arms 41, 42 to detect the position of the apparatus at rest and to provide a signal to move the apparatus to the rest position if it is not already there.

We claim:

1. Apparatus for straight-line shearing of molten glass gobs wherein first and second carriage members having mounted thereon one or more opposing pairs of shear blades are caused reciprocally to move towards each other and then away from each other along a substantially straight line between an open position and a closed, cutting position, which apparatus comprises:
   first and second carriage members,
   one or more opposing pairs of shear blades mounted on said carriage members,
   a rotatably driven shaft,
   means for rotatably driving said shaft through a cycle having a complete 360° revolution, and,
   a crank on said shaft and pivotally connected to each of said carriage members; each crank during one complete revolution of the shaft, being driven through a complete 360° revolution whereby the carriage members reciprocally move from an open to a closed position and back to the open position wherein said crank comprises diametrically opposed crank arms, a first crank arm being pivotally connected by a rod to the first carriage member and the second crank arm being pivotally connected by a rod to the second carriage member.

2. Apparatus according to claim 1, further comprising at least one wayrod extending substantially parallel to the line of movement of the carriage members and said carriage members are each slidably mounted on one or more such wayrods.

3. Apparatus according to claim 1, further comprising at least one wayrod disposed on each side of the shear blades and extending substantially parallel to the line of movement of the carriage members and said carriage members extend between opposing wayrods and are each slidably mounted on wayrods on both opposing sides or are each slidably mounted on a wayrod or wayrods on different sides.

4. Apparatus according to claim 1 wherein said driving means comprises a motor which goes from rest to speed and rest again in one revolution.

5. Apparatus according to claim 1 wherein more than one opposing pair of shear blades are mounted on the carriage members.

6. Apparatus according to claim 1, wherein the apparatus is formed as a frame for mounting below the orifice or orifices in the floor of a refractory trough when the apparatus is in use and which frame member can be swung out from below the trough.

7. Apparatus for straight-line shearing of molten glass gobs wherein first and second carriage members having mounted thereon one or more opposing pairs of shear blades are caused reciprocally to move towards each other and then away from each other along a substantially straight line between an open position and a closed, cutting position, which apparatus comprises:
   first and second carriage members,
   one or more opposing pairs of shear blades mounted on said carriage members,
   a rotatably driven shaft having diametrically opposed cranks extending from the axis thereof, a first crank being pivotally connected to a link to the first carriage member and a second crank being pivotally connected by a link to the second carriage member, and
   means for rotatably driving said shaft through a cycle having a complete 360° revolution, whereby during one complete revolution of the shaft each crank is driven through a complete 360° revolution and the carriage members reciprocally move from an open to a closed position and back to the open position.

8. Apparatus according to claim 7 wherein said driving means comprises a motor which goes from rest to speed and rest again in one revolution.

9. Apparatus for straight-line shearing of molten glass gobs wherein first and second carriage members having mounted thereon one or more opposing pairs of shear blades are caused reciprocally to move towards each other and then away from each other along a substantially straight line between an open position and a closed, cutting position, which apparatus comprises:
   first and second carriage members,
   one or more opposing pairs of shear blades mounted on said carriage members,
   at least one wayrod extending on each side of the shear blades substantially parallel to the line of movement of the carriage members, the carriage members extending therebetween and being slidably mounted thereon,
   a rotatably driven shaft,
   diametrically opposed crank arms extending from the rotatably driven shaft,
   a first rod pivotally connecting a first crank arm to the said first carriage member,
   a second rod pivotally connecting the second crank arm to the second carriage member, and
   means for rotatably driving said shaft through a cycle having a complete 360° revolution, whereby during one complete revolution of the shaft each crank is driven through a complete 360° revolution and the carriage members reciprocally move from an open to a closed position and back to the open position.

* * * * *